Patented Oct. 7, 1941

2,258,171

UNITED STATES PATENT OFFICE 2,258,171

MONOSACCHAROSE ETHERS FROM POLYSACCHARIDE ETHERS

Arthur J. Barry, Midland, Mich., assignor to The Dow Chemical Company, Midland, Mich., a corporation of Michigan No Drawing. Application August 14, 1940, Serial No. 352,631

8 Claims. (Cl. 260—209)

This invention relates to a direct hydrolytic method of producing water-soluble monosaccharose ethers from water-insoluble polysaccharide ethers. It relates in particular to a method of producing water-soluble alkyl ethers of glucose from those water-insoluble alkyl ethers of cellulose or starch, wherein the alkyl groups contain from 1 to 4 carbon atoms, inclusive.

The only operative prior method for making glucose ethers from water-insoluble polysaccharide ethers involves two separate reactions, and is not productive of a high yield when operated on any reasonably large scale. The steps in said prior method are, first, acid alcoholysis of the insoluble ether to provide a glycoside of a monosaccharose ether, and, second, hydrolysis of the glycoside to furnish the monosaccharose ether. Direct hydrolysis in one step of water-insoluble polysaccharide ethers, such as ethyl cellulose, using a water solution of hydrogen chloride as the sole hydrolytic agent, results in a charring of the carbohydrate derivative when temperatures of the order of 100° to 125° C. are employed, and no appreciable hydrolytic reaction is obtained at temperatures which do not cause charring.

It is accordingly among the objects of the invention to provide an economical, single stage method for the direct hydrolysis of water-insoluble alkyl polysaccharides, wherein the alkyl groups contain from 1 to 4 carbon atoms, inclusive, to form water-soluble alkyl ethers of monosaccharoses, without charring or resin-forming decomposition. A particular object is to provide a method as aforesaid for direct hydrolysis of water-insoluble ethyl cellulose to form water-soluble ethyl ethers of glucose. Other, and related, objects will appear as the description proceeds.

It has now been found that the foregoing and related objects may be attained by subjecting a water-insoluble alkyl ether of a polysaccharide, wherein the alkyl groups contain from 1 to 4 carbon atoms, inclusive, and which is of such a degree of substitution as to be capable of forming water-soluble alkyl ethers of monosaccharoses, to hydrolysis with a dilute water solution of a mineral acid, said water solution containing as well a water-soluble peptizing agent for the polysaccharide ether in amount and concentration sufficient to exert at least a slight surface swelling effect on the polysaccharide ether but insufficient to dissolve the same, the amount of water present in the solution being at least one mole per potential monosaccharose unit in the polysaccharide ether being treated, and preferably being in molecular excess over the peptizing agent employed. For maximum efficiency and economy of time the hydrolysis is preferably effected at a temperature in the range from about 80° to about 125° C., and under the corresponding pressure, which may be atmospheric or super-atmospheric. Lower temperatures require longer time and may result in lower yields, while higher temperatures may begin to effect caramelization or charring with consequent reduction in yield. Reflux temperatures often require about 15 hours, while 125° C. operation in a closed system under pressure requires time of the order of 4 hours.

The alkyl ethers of polysaccharides here concerned are those which are insoluble in water and wherein the alkyl groups contain from 1 to 4 carbon atoms, as those containing more than 4 carbon atoms cannot be obtained in a degree of substitution such that the corresponding alkyl monosaccharoses are soluble in water, so far as is now known. Similarly, the mono- and di-methyl polysaccharides, such as mono- and di-methyl cellulose, mono- and di-methyl starch, and the like, in general are themselves soluble in water and do not present the problem which is involved in treating the water-insoluble products. The tri-methyl polysaccharides, such as tri-methyl cellulose, are insoluble in water and may be used in the invention.

The peptizing agents for the water-insoluble alkyl ethers of polysaccharides which are contemplated for use in the invention are organic solvents which are miscible with water and which, alone, are capable of peptizing, i. e. dissolving or forming colloidal dispersions of the polysaccharide ethers. They are preferably compounds which swell but do not dissolve the polysaccharide ethers when the peptizing agent is dissolved in water in a ratio of at least one and usually not to exceed 2 or 3 moles of water for each mole of the peptizing agent. In the preferred operation hereinafter described, the aqueous acid-peptizing agent solution is employed within the above-suggested range of concentrations. The peptizing agents which find utility in the invention are of widely varying chemical types, including alcohols, ketones, ethers, esters, acids and the like, so long as these materials have the properties previously suggested. Examples of useful compounds for the purpose include the following: methyl alcohol, ethyl alcohol, isopropanol, furfuryl alcohol, tetrahydro-furfuryl alcohol, the methyl, ethyl and butyl mono-ethers of ethylene glycol, the ethyl and butyl mono-ethers of diethylene glycol, dioxane, morpholine, the 82 per cent grade of commercial methyl acetate, the acetate of diethylene glycol mono-ethyl ether, ethyl lactate, isopropyl lactate, acetone, methyl ethyl ketone, diacetone alcohol, formic acid, acetic acid, lactic acid, and the like. The foregoing list is given purely by way of illustration, and is not intended to be limiting. Because of economy, and, since the various peptizing agents in no wise enter into the reaction but serve merely as part of the reaction medium, it is preferred to use methyl or ethyl alcohol as the peptizing agent.

The hydrolysis is effected with the aid of a hydrolytic agent which is normally a mineral acid. Suitable acids for the purpose are hydrochloric acid, hydrobromic acid, sulphuric acid, phosphoric acid, and the like. Acid salts, such as sodium acid sulphate may be used, as well, and are to be understood as falling within the scope of the "mineral acid" recited in the appended claims. The mineral acid is usually employed in catalytic amounts and constitutes ordinarily from about 0.1 to about 5.0 per cent of the weight of the aqueous medium employed in the hydrolysis.

In a preferred mode of operation, which will be described with reference to the hydrolysis of water-insoluble ethyl cellulose to produce water-soluble ethyl glucoses, 100 parts by weight of ethyl cellulose is mixed with from 100 to 1000 parts by weight, and preferably with about 400 parts by weight of an aqueous solution and consisting essentially of from 0.1 to 5.0 per cent, and preferably about 2.5 per cent of a mineral acid, from about 30 to about 50 per cent of water and from about 70 to about 50 per cent of ethyl alcohol. The mixture is sealed in a pressure vessel, and is heated to about 100° to 125° C. for about 4 hours, or until the solid particles of ethyl cellulose have all disappeared into solution in the form of hydrolysis products. Heating is discontinued, the reaction mixture is cooled, and neutralized with an alkali. On evaporation of the alcohol and after removal of some of the water, the triethyl glucose crystallizes, leaving a mother liquor which, on further concentration in vacuo, yields a syrupy mixture predominantly composed of diethyl glucoses.

The following example illustrates the practice of the invention:

100 parts by weight of ethyl cellulose of 48 per cent ethoxy content (insoluble in water, but soluble in organic solvents) were dispersed in about 375 parts by weight of a 2.5 per cent solution of hydrogen chloride in a water-alcohol mixture. (The dispersion medium was prepared by mixing about 200 parts by volume of 95 per cent ethanol with about 170 parts by volume of water and about 28 parts by volume of commercial 36 per cent hydrochloric acid.) The ethyl cellulose-aqueous alcoholic acid mixture was heated in a closed system for 4 hours at 125° C., and was then cooled. The solution in the reaction vessel was clear, no insoluble ethyl cellulose remaining. The solution was neutralized with baryta water, and was then shaken with petroleum ether to extract any ethyl glycoside of ethyl glucose which might have been formed. The petroleum ether extract, which accounted for only about 6 per cent of the ethyl cellulose originally employed, was a yellow oil conforming to the known properties of ethyl ethyl glucosides. The aqueous liquor was concentrated to crystallization, 56 parts by weight of crystals of crude triethyl glucose being obtained. After purification, 50 parts of pure triethyl glucose remained. The mother liquor from the crystallization was further evaporated in vacuo to remove all remaining water and alcohol. 49 parts of a clear, nearly colorless syrup was obtained, consisting principally of diethyl glucoses. Based on the ethyl cellulose employed, 108 parts of various ethyl glucoses were theoretically possible. There was actually obtained 99 parts, or 92 per cent yield of ethyl glucoses directly and only about 6 per cent of the ethyl cellulose was converted to the ethyl ethyl glucosides.

In similar runs, wherein dioxane, acetone, and other of the above-named peptizing agents were employed, yields of the order of 90 to 98 per cent were obtained with 96 per cent being the average.

The example has shown the treatment of ethyl cellulose to make ethyl glucoses. Other cellulose ethers which may be treated in like manner to give the corresponding glucose ethers include propyl cellulose, ethyl propyl cellulose, methyl propyl cellulose, methyl ethyl cellulose, and butyl cellulose containing 1 or 2 butyloxy groups per anhydroglucose unit, the tributyl cellulose not being used because it would yield a water-insoluble tributyl glucose. Ethyl butyl cellulose may also be employed, as may methyl butyl cellulose and trimethyl cellulose. The corresponding water-insoluble alkyl ethers of such other polysaccharides, for example, as starch, inulin, glycogen, lichenin, chitin, mannan, araban, xylan, or of other polyhexoses or polypentoses may be treated similarly to form the corresponding water-soluble ethers of the monosaccharoses of which the respective polysaccharides are composed.

I claim:

1. A method for the single stage hydrolysis of water-insoluble alkyl polysaccharides, wherein the alkyl groups containing from 1 to 4 carbon atoms, and which is of a degree of substitution to yield water-soluble hydrolysates, which comprises mixing the said water-insoluble polysaccharide ether with a dilute water solution of a mineral acid hydrolytic agent containing as well a water-soluble organic solvent, which alone is capable of peptizing the polysaccharide ether, in concentration sufficient to exert at least a slight surface swelling effect on the polysaccharide ether, said water solution containing at least one mole of water for each monosaccharose unit in the polysaccharide ether being treated and at least one mole of water for each mole of peptizing agent present, and heating the mixture to a temperature above about 80° C. but below the temperature at which decomposition and charring occur, until the polysaccharide ether is hydrolyzed and the solution is substantially free from solids in suspension, thereby to form an aqueous solution of water-soluble monosaccharose ethers.

2. A method for the single stage hydrolysis of water-insoluble alkyl polysaccharides, wherein the alkyl groups contain from 1 to 4 carbon atoms, and which is of a degree of substitution to yield water-soluble hydrolysates, which comprises mixing 1 part by weight of the said water-insoluble polysaccharide ether with from 1 to 10 parts by weight of an aqueous solution consisting essentially of from 0.1 to 5.0 per cent of a mineral acid hydrolytic agent, from about 30 to about 50 per cent of water and from about 70 to about 50 per cent of ethyl alcohol, heating the mixture under pressure at a temperature of about 100° to 125° C. until the polysaccharide ether is hydrolyzed and the solution is substantially free from solids in suspension, thereby to form an aqueous solution of water-soluble monosaccharose ethers.

3. A method for the single stage hydrolysis of water-insoluble alkyl polysaccharides, wherein the alkyl groups contain from 1 to 4 carbon atoms, and which is of a degree of substitution to yield water-soluble hydrolysates, which comprises mixing 1 part by weight of the said water-insoluble polysaccharide ether with about 4 parts by weight of an aqueous solution consisting essentially of about 2.5 per cent of hydrogen chloride in solution in an approximately 50—50 mixture of ethyl alcohol in water, heating the mixture to between 80° and 125° for about 4 hours in a closed vessel under the corresponding pressure to effect hydrolysis of the polysaccharide ether to the water-soluble monosaccharose ethers, and separating the said monosaccharose ethers from the so-formed aqueous solution.

4. A method for the single stage hydrolysis of water-insoluble alkyl ethers of cellulose, wherein the alkyl groups contain from 1 to 4 carbon atoms, and which is of a degree of substitution to yield water-soluble hydrolysates, which comprises mixing the said water-insoluble cellulose ether with a dilute water solution of a mineral acid hydrolytic agent containing as well a water-soluble organic solvent, which alone is capable of peptizing the cellulose ether, in concentration sufficient to exert at least a slight surface swelling effect on the cellulose ether, said water-solution containing at least one mole of water for each anhydro-glucose unit in the cellulose ether being treated and at least one mole of water for each mole of peptizing agent present, and heating the mixture to a temperature above about 80° C. but below the temperature at which decomposition and charring occur, until the cellulose ether is hydrolyzed and the solution is substantially free from solids in suspension, thereby to form an aqueous solution of water-soluble glucose ethers.

5. A method for the single stage hydrolysis of water-insoluble ethyl cellulose, which comprises mixing such an ethyl cellulose with a dilute water solution of a mineral acid hydrolytic agent containing as well a water-soluble organic solvent, which alone is capable of peptizing the ethyl cellulose, in concentration sufficient to exert at least a slight surface swelling effect on the ethyl cellulose, said water solution containing at least one mole of water for each anhydro-glucose unit in the ethyl cellulose being treated and at least one mole of water for each mole of peptizing agent present, and heating the mixture to a temperature above about 80° C. but below the temperature at which decomposition and charring occur, until the ethyl cellulose is hydrolyzed and the solution is substantially free from solids in suspension, thereby to form an aqueous solution of water-soluble glucose ethers.

6. A method for the single stage hydrolysis of water-insoluble ethyl cellulose, which comprises mixing 1 part by weight of such an ethyl cellulose with from 1 to 10 parts by weight of an aqueous solution consisting essentially of from 0.1 to 5.0 per cent of a mineral acid hydrolytic agent, from about 30 to about 50 per cent of water and from about 70 to about 50 per cent of ethyl alcohol, heating the mixture under pressure at a temperature of about 100° to 125° C. until the ethyl cellulose is hydrolyzed and the solution is substantially free from solids in suspension, thereby to form an aqueous solution of water-soluble ethyl glucoses.

7. A method for the single stage hydrolysis of water-insoluble ethyl cellulose, which comprises mixing 1 part by weight of such an ethyl cellulose with about 4 parts by weight of an aqueous solution consisting of about 2.5 per cent of hydrogen chloride in solution in an approximately 50—50 mixture of ethyl alcohol in water, heating the mixture to between 80° and 125° C. for about 4 hours in a closed vessel under the corresponding pressure to effect hydrolysis of the ethyl cellulose to water-soluble ethyl glucoses and separating the ethyl glucoses from the so-formed aqueous solution.

8. A method for the single stage hydrolysis of water-insoluble ethyl cellulose, which comprises mixing 1 part by weight of such an ethyl cellulose with about 4 parts by weight of an aqueous solution consisting of about 2.5 per cent of hydrogen chloride in solution in an approximately 50—50 mixture of ethyl alcohol in water, heating the mixture to between 80° and 125° C. for about 4 hours in a closed vessel under the corresponding pressure to effect hydrolysis of the ethyl cellulose to water-soluble ethyl glucoses, concentrating the solution to crystallize tri-ethyl glucose, separating the crystals from the mother liquor, and removing remaining water and alcohol from the mother liquor to recover mixed ethyl glucoses as a syrupy liquid.

ARTHUR J. BARRY.